United States Patent
Denis et al.

(10) Patent No.: US 11,579,995 B2
(45) Date of Patent: Feb. 14, 2023

(54) ELECTRONIC ELEMENT, SYSTEM COMPRISING SUCH AN ELECTRONIC ELEMENT AND METHOD FOR MONITORING AND CUTTING OFF A PROCESSOR ON OCCURRENCE OF A FAILURE EVENT

(71) Applicant: IDEMIA France, Courbevoie (FR)

(72) Inventors: Sylvestre Denis, Courbevoie (FR); Emmanuelle Dottax, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 384 days.

(21) Appl. No.: 16/787,335

(22) Filed: Feb. 11, 2020

(65) Prior Publication Data
US 2020/0257603 A1    Aug. 13, 2020

(30) Foreign Application Priority Data
Feb. 12, 2019 (FR) ........................................ 1901374

(51) Int. Cl.
*G06F 11/30* (2006.01)
*G06F 1/3246* (2019.01)
*G06F 7/58* (2006.01)
*G06F 9/54* (2006.01)
(Continued)

(52) U.S. Cl.
CPC ........ *G06F 11/3024* (2013.01); *G06F 1/3246* (2013.01); *G06F 7/588* (2013.01); *G06F 9/542* (2013.01); *G06F 9/546* (2013.01); *G06F 11/076* (2013.01); *G06F 11/3058* (2013.01); *G06F 21/64* (2013.01)

(58) Field of Classification Search
CPC .......... G06F 21/64; G06F 21/60; G06F 21/71; G06F 21/76; G06F 21/70; G06F 11/07; G06F 11/0721; G06F 11/0766; G06F 11/324; G06F 11/3058; G06F 11/076; G06F 11/3024; G06F 1/3246; G06F 9/546
See application file for complete search history.

(56) References Cited

U.S. PATENT DOCUMENTS

| | | | |
|---|---|---|---|
| 4,689,766 A * | 8/1987 | Kent | G06F 11/326 714/E11.003 |
| 6,411,872 B1 * | 6/2002 | Fujita | G06F 11/0757 701/29.2 |
| 10,025,649 B2 * | 7/2018 | Kelly | G06F 3/0653 |

(Continued)

FOREIGN PATENT DOCUMENTS

FR    2879320 A1    6/2006

OTHER PUBLICATIONS

FR Search Report, dated Nov. 15, 2019, from corresponding FR application No. 1901374.

*Primary Examiner* — Raymond N Phan
(74) *Attorney, Agent, or Firm* — Nixon & Vanderhye

(57) ABSTRACT

An electronic element includes: a module for storing reference data; a module for receiving data from a processor; a module for verifying the received data by comparison by way of reference data; and a module for transmitting an instruction to cut off supply of the processor, the supply cutoff instruction being transmitted after occurrence of a failure event, the failure event being an absence of reception of data or a failure in verifying the data. A system including such an electronic element and a method for monitoring a processor by the electronic element are also described.

11 Claims, 2 Drawing Sheets

(51) Int. Cl.
*G06F 11/07* (2006.01)
*G06F 21/64* (2013.01)

(56) References Cited

U.S. PATENT DOCUMENTS

| | | | |
|---|---|---|---|
| 10,719,606 B2* | 7/2020 | Sanchez Diaz | G06F 21/606 |
| 2006/0219796 A1* | 10/2006 | Na | G07F 7/082 |
| | | | 235/492 |
| 2007/0113120 A1* | 5/2007 | Dodge | G06F 11/1068 |
| | | | 714/E11.038 |
| 2007/0168793 A1 | 7/2007 | Seo | |
| 2014/0289874 A1 | 9/2014 | Lee et al. | |
| 2021/0312055 A1* | 10/2021 | Kloth | H04L 9/0897 |

\* cited by examiner

# ELECTRONIC ELEMENT, SYSTEM COMPRISING SUCH AN ELECTRONIC ELEMENT AND METHOD FOR MONITORING AND CUTTING OFF A PROCESSOR ON OCCURRENCE OF A FAILURE EVENT

FIELD OF THE INVENTION

The present invention generally relates to the field of the security of an electronic unit, for example, a processor.

It relates more specifically to an electronic element, a system comprising such an electronic element and a method for monitoring a processor.

DESCRIPTION OF RELATED ART

Electronic components such as watchdogs make it possible to ensure that a processor does not remain blocked at a particular step of the algorithm that it implements. If the watchdog does not receive any life signal, it sends a signal in order to restart the processor.

However, these electronic components are not suitable for ensuring the functioning security of the processor. In particular, they do not make it possible to verify that the software executed by the processor has not been corrupted.

SUMMARY OF THE INVENTION

In this context, the present invention provides an electronic element making it possible to ensure the security of a processor.

More specifically, in an embodiment of the invention, an electronic element comprises:
  a module for storing reference data,
  a module for receiving data from a processor,
  a module for verifying the received data by comparison by means of the reference data, and
  a module for transmitting an instruction to cut off supply of the processor, the supply cutoff instruction being transmitted after occurrence of a failure event, the failure event being an absence of reception of data or a failure in verifying said data.

Thus, the electronic element is designed to verify the data used by the processor, in particular, by comparing them to reference data. In case of incident detected during this verification, signifying, for example, a suspicion of corruption of data that the processor uses, the electronic element transmits an instruction to cut off supply of the processor, thus forcing the processor to be cut off. The system, now out of service, can then only be put back into service with the intervention of an external operator.

Other non-limiting and advantageous possible features of the electronic element, taken individually or according to any technically possible combinations, are as follows:
  the failure event is an absence of receiving data in a predetermined time interval,
  the failure event is a failure in verifying said received data in a predetermined time interval, after complete reception of said data,
  a module for transmitting an instruction to restart the processor is also provided, in case of occurrence of a failure event,
  the instruction to cut off supply of the processor is transmitted when a number of instructions to restart the processor has reached a determined threshold,
  a module for transmitting a notification in case of occurrence of a failure event is also provided, and
  the module for verifying the received data is designed to determine a digest of the data and to compare the digest of the data to the reference data.

The invention also provides a system comprising an electronic element such as defined above, and the processor. The system can also comprise a circuit for managing supply of the processor designed to receive the instruction to cut off supply of the processor. The system can comprise a memory and the processor can comprise a unit for reading said data in said memory.

The invention also provides a method for monitoring a processor by an electronic element comprising a module for storing reference data, the method comprising steps of:
  receiving data from the processor,
  verifying the received data by comparison by means of the reference data, and
  transmitting an instruction to cut off supply of the processor, the supply cutoff instruction being transmitted after occurrence of a failure event, the failure event being an absence of reception of data or a failure in verifying said data.

Other non-limiting and advantageous possible features of the monitoring method, taken individually or according to any technical possible combinations, are as follows:
  a step of transmitting an instruction to restart the processor is also provided in case of occurrence of a failure event,
  the failure event corresponds, after complete reception of data coming from the processor, to a failure to verify data due to said received data being different from said reference data,
  the failure event corresponds to an absence of receiving data in a predetermined time interval,
  a memory being associated with the processor, a prior step is also provided of reading said received data in said memory and by the processor,
  a step of drawing a random value by the electronic element is also provided, the reading step being carried out by reading a portion of said memory designated by the random value,
  a step is also provided of updating the reference data of the electronic element by new data,
  the updating step is carried out after verification of an electronic signature of said new reference data,
  a step of updating said memory is also provided, and
  the step of updating the reference data is triggered in case of occurrence of a success event of the step of updating said memory.

The following description made in view of the appended drawings, given as non-limiting examples, will make what the invention consists of, and how it can be achieved, well understood.

DETAILED DESCRIPTION OF EMBODIMENTS OF THE INVENTION

Figure 1:
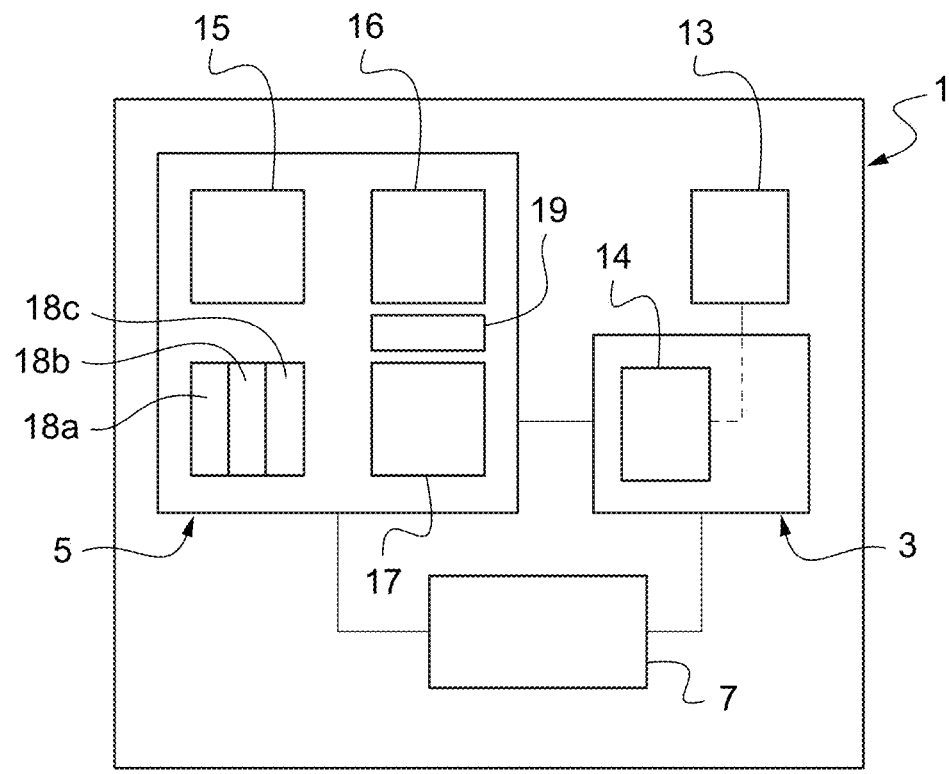
FIG. 1 represents a system according to an embodiment of the invention.

FIG. 1 represents a system 1 making it possible to monitor an electronic entity (such as the processor 3 described below). This system 1 integrates, in practice, an electronic component (such as the electronic element 5 described below) making it possible to guarantee the security of the electronic entity, for example of the operating system thereof.

In practice here, the system 1 is designed to ensure the monitoring of a processor 3, and in particular, to verify that it has not been corrupted. For example, the system 1 is suitable for verifying that the operating system of the processor 3 has not been modified.

The system 1 is, for example, designed to equip a motor vehicle. In practice, the system 1 is, for example, an embedded system such as a camera.

As can be seen in FIG. 1, the system 1 comprises the processor 3, an electronic element 5, a memory 13 and a power supply management circuit 7. These different circuits are, for example, connected to one another as described below in reference to FIG. 2. The system 1 forms, for example, in practice, an electronic control unit (ECU) embedded in the vehicle. Moreover, the memory 13 is here formed by a circuit separate from the processor 3, as represented in FIG. 1. In a variant, the memory 13 could however be included (in practice, integrated) in the processor 3.

The electronic element 5 is, for example, a microcircuit, such as a secure element (SE), possibly integrated (or eSE for "Embedded Secure Element"). The electronic element 5 can thus respond to a certain certification level (such as EAL4+ or FIPS).

In practice, the system 1 comprises a set of modules (all are not represented in FIG. 1). These modules can be implemented, in practice, by a combination of hardware elements and software elements. Each module has a functionality described in the method according to the invention and outlined below. Thus, for each module, the system 1 stores (within a memory associated respectively with the processor 3 or with the electronic element 5), for example software instructions which can be executed by the processor 3 or the electronic element 5 of the system 1 in order to thus implement the functionality provided by the module.

The processor 3, in practice, for example a microcontroller, comprises a unit for reading data 14 making it possible for it to access the memory 13. The data reading unit 14 is here functional, for example implemented due to the execution of dedicated instructions by the processor 3.

The processor 3 stores data, for example here linked to the operating system of the system. This data is stored in the memory 13 associated with the processor 3. This memory 13 is divided into a plurality of portions. Each portion thus contains a portion of all of the data. Each of the portions of the memory 13 is here identified by a value. The processor 3 therefore associates some of the data to a value. The processor 3 is, for example, connected to the communication bus of the motor vehicle (or "Controller Area Network").

The data reading unit 14 is designed to make it possible to read data stored in the memory 13 associated with the processor 3.

The power supply of the processor 3 is ensured and controlled by the power supply management circuit 7. In other words, the supply management circuit 7 controls the power up, the restarting and the power down of the processor 3, as well as of the electronic element 5 (and therefore of the system 1).

As represented in FIG. 1, the system 1 also comprises the electronic element 5. The electronic element 5 comprises a storage module 15, a module for receiving data 16, a module for verifying data 17, at least one module for transmitting instructions 18a, 18b, 18c and a module for measuring time 19.

Here, the electronic element 5 comprises three instruction transmission modules: a module for transmitting a delay notification 18a, a module for transmitting an instruction for restarting 18b the processor 3 and a module for transmitting an instruction to cut off 18c (power) supply of the processor 3. The three modules for transmitting notification or instruction are here functional, for example implemented by a microprocessor, programmed in particular for this purpose. The modules for transmitting instructions 18a, 18b, 18c are connected to the power supply management circuit 7 and communicate the transmitted notifications or instructions to this power supply management circuit 7 (which then acts on the processor 3 according to the notification or instruction received).

The storage module 15 is suitable for storing data, and in particular reference data used during the implementation of the method described below.

Figure 2:
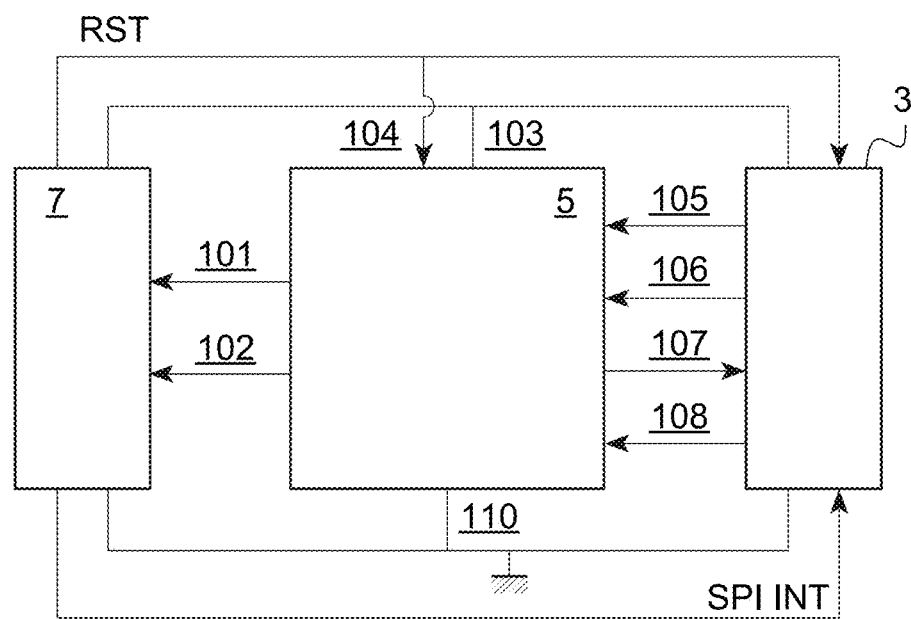
FIG. 2 represents certain components of the system of FIG. 1.

The electronic element 5 is connected to the processor 3 (as can be seen in FIG. 2 and described below), which makes it possible for the module for receiving data 16 (which is here functional) to receive the data transmitted by the processor 3 and for the module for verifying data 17 to verify the data transmitted from the processor 3 to the electronic element 5. In practice, the module for verifying data 17 is designed to determine a digest of the data received by the electronic element 5 and to compare this digest of the data with the reference data. The digest of the received data is, for example, obtained by application of a hash function (here of SHA256 type) to this data.

The electronic element 5 also comprises at least one module for measuring time 19. This module for measuring time 19, which is also functional, is designed to measure the execution time of different steps of the method described below, by way, for example, of a microprocessor programmed for this purpose. In practice, this module for measuring time 19 compares a measured execution time to at least one predetermined time interval allocated for the execution of the step in question.

In practice, the electronic element 5 comprises a plurality of pins, making possible, for example, the connection of the electronic element 5 and of other components of the system 1. In the example represented in FIG. 2, the electronic element 5 comprises nine pins. The pins 101, 102, 103, 104, 105, 106, 107, 108 enable, here, the connection to the processor 3 and to the power supply management circuit 7. The pin 110 enables the connection of electronic element 5 to the ground.

The two pins 101, 102 are designed to enable a communication with the power supply management circuit 7. In practice, these two pins 101, 102 make it possible to implement three mechanisms: a notification mechanism, a restart mechanism and a supply cutoff mechanism. These three mechanisms are, for example, here triggered by reusing inputs/outputs conventionally designated SWP and I/O. Each of the three abovementioned mechanisms is thus, for example, triggered by a specific value of the two bits represented by the electrical levels present on the pins 101, 102 (the fourth possible value corresponding to an idle state without any mechanism triggering).

The pin 103 is designed to enable the transmission of a supply voltage from the power supply management circuit 7 to the electronic element 5.

The pin 104 is a pin for restarting the electronic element 5.

The four pins 105, 106, 107, 108 are designed to enable a communication with the processor 3. These four pins 105, 106, 107, 108 enable, in particular, the data exchange with the processor 3. The four pins 105, 106, 107, 108 enable here an SPI (Serial to Peripheral Interface) connection.

Figure 3:
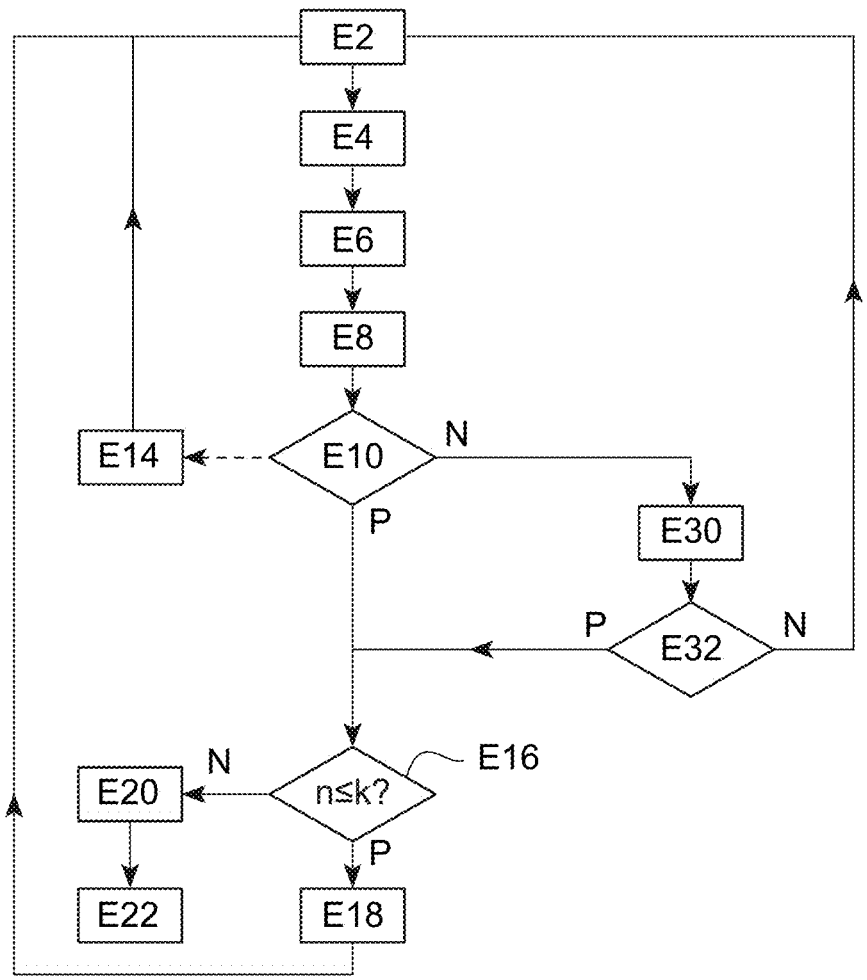
FIG. 3 represents, in the form of a flowchart, an example of a method implemented in the system of FIG. 1.

FIG. 3 represents an example of a method implemented in the system 1 according to the invention.

This method constitutes a method for monitoring the processor 3 by the electronic element in order to ensure that the processor 3 and the data that it comprises have not been corrupted.

Prior to the implementation of the method, it is assumed that the system 1 is switched on and therefore, that the modules that it comprises are used. For example, if the system 1 is installed in a motor vehicle, it can be assumed that the motor vehicle is being used (the verifications described below being, for example, made upon the starting of vehicle).

As represented in FIG. 3, the method starts in step E2. During this step, the electronic element 5 draws a random value. This random value makes it possible to determine the portion of the memory 13 which will be verified during the method as described below.

In step E4, the electronic element 5 transmits to the processor 3, the random value drawn (and therefore information on the portion of the memory 13 which will be concerned by the execution of the method). To do this, in the example described here, the electronic element triggers the notification mechanism mentioned above (by applying, on the pins 101, 102, electrical levels indicative of the notification mechanism). Due to the notification mechanism, the power supply management circuit 7 transmits an interrupt signal SPI INT to the processor 3, so that the processor 3 receives the random value via the connection formed here by the four pins 105, 106, 107, 108.

The processor 3 thus identifies the portion of the memory in question and reads the data of this portion of the memory 13 in step E6 by means of the unit for reading data 14.

In practice, for certain executions of steps E2, E4 and E6, the step of randomly selecting data to be verified can be omitted. Indeed, in this case, it can be provided that the data stored in certain portions of the memory 13 associated with the processor 3 are fully verified. It is, for example, the case for memory portions brought into play during the startup of the system 1. The random verification (such as it results from steps E2 and E4 described above) is, for example, implemented for data stored in memory portions storing applications for the system 1.

The method is continued in step E8. During this step, the processor 3 sends to the electronic element 5 (via the abovementioned SPI connection), the data contained in the portion of the memory 13 associated with the random value.

As can be seen in FIG. 3, the method is continued in step E10. During this step, the electronic element 5 detects if a first failure event occurs. This first failure event here relates to, for example, the absence of reception of the data by the electronic element 5 during a predetermined time interval. The module for measuring time is, for example, triggered during the powering up of the processor 3 and the time measured (here between the powering up of the processor 3 and the reception of the data by the electronic element 5) must be comprised in the predetermined time interval. In a variant, the first failure event can also correspond to a partial reception of the data by the electronic element 5 in the predetermined time interval.

If the electronic element 5 detects this first failure event (in the example described here during the verification of a portion of the memory 13 used for the starting of the processor 3), the method is continued in step E16 described below.

In a variant (for example, here during the verification of a portion of the memory 13 linked to applications which can be executed by the processor 3), as represented as a dotted line in FIG. 3, upon detection of an absence of receiving all the data (relating to this memory 13 portion) by the electronic element 5 upon the expiry of a predetermined time interval (step E10), the method is continued in step E14 during which a delay notification is sent to the processor 3.

The processor 3 is thus informed of the absence of reception by the electronic element 5 of the data to be verified and the processor 3 can adapt the functioning thereof, consequently.

In the example described here, step E14 is implemented by triggering (by the electronic element 5) the notification mechanism mentioned above (the electronic element 5 applying on the pins 101, 102 electrical levels indicative of the notification mechanism). Due to the notification mechanism, the power supply management circuit 7 transmits an interrupt signal SPI INT to the processor 3 so that the processor 3 reads the delay notification (transmitted during this step E14) via the connection (here, of SPI type) formed in the present example by the four pins 105, 106, 107, 108.

After this step E14, the method continues in step E2 described above with the random drawing of a new value, in order to again attempt to verify the data stored in the processor 3.

In step E16 (reached when a first failure event is detected in the case described above), the electronic element 5 evaluates the number n of instructions to restart the processor 3 which have been transmitted during the verification of the data of the memory portion in question. In particular, the electronic element 5 compares the number n evaluated with an acceptable restart threshold number k during the verification of the data of the memory portion in question. In other words, in step E16, the electronic element 5 compares n and k.

As represented in FIG. 3, if the number n of instructions to restart the processor 3 is less than (or equal) to the restart threshold number k, an instruction to restart the processor 3 is transmitted by the electronic element 5 to the power supply management circuit 7 in step E18. All of the elements of the system 1 and therefore, in particular, the processor 3 and the electronic element 5 are restarted (by the power supply management circuit 7 which controls the restarting, in practice by applying a suitable level to the restart terminals of the processor 3 and of the electronic element 5).

In the example described here, the electronic element 5 triggers the restart mechanism mentioned above by applying, to the pins 101, 102, electrical levels indicative of the restart mechanism (these electrical levels representing, in this case, the restart instruction). The power supply management circuit 7 is designed to then transmit a restart command RST, which is applied to the restart terminal 104 of the electronic element 5 and to a restart terminal of the processor 3.

After the restarting of all of the elements of the system 1 and possibly the implementation of steps without any link to the invention described here, the method continues in step E2.

If the number n of instructions to restart the processor 3 is greater than the restart threshold number k in step E16, this means that despite several restarts, the verification of the data cannot be done correctly, and the processor is probably corrupted. In order to not continue a functioning of the system 1 while the processor 3 seems corrupted, the electronic element 5 generates, aiming to the power supply management circuit 7, an instruction to cut off supply of the system 1 in step E20.

In the example described here, the electronic element 5 triggers the mechanism for cutting off supply mentioned above by applying to the pins 101, 102, electrical levels indicative of the supply cutoff mechanism (these electrical levels representing, in this case, the supply cutoff instruction).

The power supply management circuit 7 thus cuts off the supply of the processor (and of the electronic element 5) in step E22, powering down the processor 3 (as well as the electronic element 5 and therefore the system 1), thus blocking the use thereof, since it is probably corrupted. The blocking will be persistent, even in case in the repowering up of the system, i.e. that the electronic element 5, persistently storing, that it is in supply cutoff mode, will re-block the processor 3 instantly after the next power up. The system 1 can thus only be put back into service after a maintenance operation ensured by an external operator.

If, on the contrary, in step E10, no failure event has been detected, this means that the data has been fully transmitted from the processor 3 to the electronic element 5, and that the electronic element 5 has actually received it. The method thus continues in step E30. During this step, the electronic element 5 verifies the data received. In practice, the module for verifying the electronic element 5 determines a digest of the data received and compares this digest of the data received to the reference data stored in the storage module 15. The digest of the data is, for example, determined by application of a hash function, for example, of the SHA256 type.

In step E32, the electronic element 5 detects if a second failure event occurs. This second failure event here relates to, for example, a failure during the verification of the data received during another predetermined time interval. The module for measuring time, here measures an execution time since the powering up of the processor 3 and compares this execution time to the other predetermined time interval. For example, in the case of the second failure event, the data received is different from the reference data stored. In a variant, the second failure event may correspond to a partial verification of the data received in the other predetermined time interval.

In case of detecting the second failure event in step E32, the method continues in step E16 described above.

In the absence of detecting the second failure event in step E32 (i.e. if the data received from the processor 3 is correctly verified by the comparison mentioned above in the other predetermined time interval), this means that the verification of the data has been a success. The method thus continues in step E2 with the verification of a new portion of the memory 13 associated with the processor 3 (possibly after the implementation of other steps without any link to the invention described here). In other words, a verification loop of the data associated with the processor 3 is therefore implemented.

Figure 4:
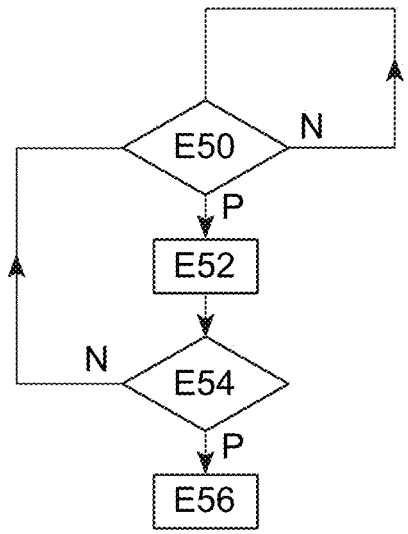
FIG. 4 represents, in the form of a flowchart, another example of a method implemented in the system of FIG. 1.

In practice, the processor 3 is likely to receive new data coming from a component external to the system 1. For example, this is data making it possible to update the data stored in the memory 13, for example an updating of the operating system of the processor 3. The updating steps are represented in the flowchart of FIG. 4. In practice, other steps not described here can be implemented between the method represented in FIG. 3 and the steps which can be seen in FIG. 4.

The method for updating the memory 13 with new data starts in step E50. During step E50, the processor 3 detects if new data is available.

If no new data is available, this means that the memory 13 associated with the processor 3 is updated (the processor 3 remains awaiting new data).

However, if new data is available, the method continues in step E52. During this step, the processor 3 stores the new data in the memory 13.

In step E54, the electronic element 5 verifies that the new data is acceptable by verifying the electronic signature of this new data (received in step E52). To do this, the electronic element 5 can implement an algorithm for verifying the electronic signature using a public key (for example, the public key of the supplier of the new data in question), the new data and the electronic signature. In practice, for example, the electronic element 5 calculates a hash (or a summary of this data formed of a plurality of hashes) of all of the new data on the one hand, and applies, on the other hand, a cryptographic algorithm to the electronic signature. The electronic element 5 thus compares the hash obtained to the result of the application of the cryptographic algorithm.

If a failure in verifying the electronic signature is observed in step E54, i.e. if the algorithm for verifying the abovementioned electronic signature gives a negative result (in the abovementioned example, if the hash obtained from the new data is different from the result of the application of the cryptographic algorithm to the electronic signature), the system 1 is restarted and the method continues in step E50, with the search for a possible new updating of the data of the memory 13 associated with the processor 3. Following a failure in verifying the electronic signature (the reference data not therefore being updated), and in the case of a subsequent verification according to FIG. 3, the verification of the data received in step E30 could not be conclusive. In this case, the method would continue by a restarting or powering down as indicated above.

If the electronic signature of the new data is successfully verified in step E54, i.e. if the algorithm for verifying the abovementioned electronic signature gives a positive result (in the abovementioned example if the hash obtained from new data corresponds to the result of the application of the cryptographic algorithm to the electronic signature), the method continues in step E56, where the processor 3 confirms to the electronic element 5, the updating of the new data received in the memory 13 which leads to the updating of the reference data in the storage module 15 of the electronic element 5. The reference data is thus replaced by new reference data. In practice, for each portion of the memory 13, a new digest of the new data is determined by application of the same hash function as that introduced before. All the new digests of new data will constitute all the new reference data (which will be stored in the storage module 15).

Following these updating steps, the new data stored in the processor 3 and the new reference data stored in the electronic element 5 are that which will be used during the next powering up of the system 1, i.e. the implementation of the method represented in FIG. 3.

The invention claimed is:

1. An electronic element, comprising:
   a module for storing reference data;
   a module for receiving data from a processor;
   a module for verifying the received data by comparison by means of the reference data;
   a module for transmitting an instruction to cut off supply of the processor, the supply cutoff instruction being transmitted after occurrence of a failure event, the failure event being an absence of reception of data or a failure in verifying said data; and
   a module for transmitting an instruction to restart the processor in case of occurrence of the failure event,
   wherein, when a number of instructions to restart the processor has reached a determined threshold, the instruction to cut off supply of the processor is transmitted.

2. The electronic element according to claim 1, further comprising:
   a module for transmitting a notification in case of occurrence of the failure event.

3. The electronic element according to claim 1, wherein the module for verifying the received data is configured to determine a digest of the data and to compare the digest of the data to the reference data.

4. A system comprising an electronic element according to claim 1, and said processor.

5. The system according to claim 4, comprising a supply management circuit of the processor configured to receive the instruction to cut off supply of the processor.

6. The system according to claim 4, comprising a memory and wherein the processor comprises a unit for reading said data in said memory.

7. A method for monitoring a processor by an electronic element equipped with a module for storing reference data, the method comprising steps of:
   receiving data from the processor;
   verifying the received data by comparison by means of the reference data;
   transmitting an instruction to cut off supply of the processor, the supply cutoff instruction being transmitted after occurrence of a failure event, the failure event being an absence of reception of data or a failure in verifying said data; and
   transmitting an instruction to restart the processor in case of occurrence of the failure event,
   wherein, when a number of instructions to restart the processor has reached a determined threshold, the instruction to cut off supply of the processor is transmitted.

8. The method according to claim 7,
   wherein a memory is associated with the processor,
   wherein the method further comprises a prior step of:
      reading, in said memory and by the processor, said received data, and
   wherein the method yet further comprises a step of:
      drawing a random value by the electronic element, the reading step being carried out by reading a portion of said memory designated by the random value.

9. The method according to claim 7, also further comprising a step of:
   updating the reference data with new reference data.

10. The method according to claim 9, wherein the updating step is carried out after verification of an electronic signature of said new reference data.

11. The method according to claim 8, also further comprising steps of:
   updating said memory; and
   updating the reference data with new reference data,
   wherein the step of updating the reference data is triggered in case of occurrence of a success event of the step of updating said memory.

* * * * *